(12) United States Patent
Xu et al.

(10) Patent No.: US 12,014,006 B2
(45) Date of Patent: Jun. 18, 2024

(54) TOUCH CONTROL DISPLAY SUBSTRATE, TOUCH CONTROL DISPLAY DEVICE, AND TOUCH CONTROL SIGNAL LINE DISTRIBUTION METHOD

(71) Applicants: Hefei Xinsheng Optoelectronics Technology Co., Ltd., Anhui (CN); BOE Technology Group Co., Ltd., Beijing (CN)

(72) Inventors: Jiawei Xu, Beijing (CN); Yun Du, Beijing (CN); Zhao Dong, Beijing (CN); Wenjin Fan, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/639,238

(22) PCT Filed: Apr. 28, 2021

(86) PCT No.: PCT/CN2021/090465
§ 371 (c)(1),
(2) Date: Nov. 3, 2022

(87) PCT Pub. No.: WO2022/226822
PCT Pub. Date: Nov. 3, 2022

(65) Prior Publication Data
US 2024/0045546 A1    Feb. 8, 2024

(51) Int. Cl.
*G06F 3/041* (2006.01)
*G06F 3/045* (2006.01)

(52) U.S. Cl.
CPC .......... *G06F 3/0418* (2013.01); *G06F 3/045* (2013.01); *G06F 2203/04102* (2013.01); *G06F 2203/04107* (2013.01)

(58) Field of Classification Search
CPC .................. G06F 3/0418; G06F 3/045; G06F 2203/04102; G06F 2203/04107
See application file for complete search history.

(56) References Cited

U.S. PATENT DOCUMENTS

2016/0179229 A1* 6/2016 Ahn .................. G06F 3/0443
                                                345/173
2017/0031487 A1* 2/2017 Wang ................ G06F 3/0412
(Continued)

FOREIGN PATENT DOCUMENTS

CN    107065365 A    8/2017
CN    107357467 A    11/2017
(Continued)

*Primary Examiner* — Afroza Chowdhury
(74) *Attorney, Agent, or Firm* — IPro, PLLC

(57) ABSTRACT

A touch display substrate is provided, including a central touch area and a routing area located around the central touch area, where the routing area is provided with isolation lines and a plurality of touch signal lines led out from the central touch area, the extension direction of the isolation lines is parallel to the extension direction of the touch signal lines, the touch signal lines include first touch signal lines arranged close to the isolation lines and second touch signal lines arranged far from the isolation lines, and the width of the first touch signal lines is greater than the width of the second touch signal lines. A touch display device and a touch control signal line distribution method are provided.

12 Claims, 5 Drawing Sheets

(56) References Cited

U.S. PATENT DOCUMENTS

| | | | |
|---|---|---|---|
| 2017/0097727 A1* | 4/2017 | Wu | G06F 3/0445 |
| 2019/0243495 A1* | 8/2019 | Guo | G02F 1/134309 |
| 2022/0206606 A1* | 6/2022 | Ye | G06F 3/0443 |

FOREIGN PATENT DOCUMENTS

| | | |
|---|---|---|
| CN | 210488527 U | 5/2020 |
| CN | 111427476 A | 7/2020 |
| CN | 112612371 A | 4/2021 |
| WO | 2017016166 A1 | 2/2017 |

\* cited by examiner

TOUCH CONTROL DISPLAY SUBSTRATE, TOUCH CONTROL DISPLAY DEVICE, AND TOUCH CONTROL SIGNAL LINE DISTRIBUTION METHOD

CROSS-REFERENCE TO RELATED APPLICATION

The present application is the U.S. national phase of PCT Application No. PCT/CN2021/090465 filed on Apr. 28, 2021, which is incorporated herein by reference in its entirety.

TECHNICAL FIELD

The present disclosure relates to the technical field of display product manufacturing, and particularly relates to a touch control display substrate, a touch control display device, and a touch control signal line distribution method.

BACKGROUND

Flexible touch screens are widely used in curved mobile phones, wearable devices, bendable devices, and other advanced display fields due to their bendable characteristics. Flexible touch products require bendable and narrow frame features, and currently routing materials are APC metal, mainly containing Ag, Pd, Cu, etc. Since silver cannot form a stable and passivated oxide film, the electrical chemical migration and corrosion easily occurs on the silver material.

SUMMARY

In order to solve the above-mentioned technical problems, the present disclosure provides a touch control display substrate, a touch control display device, and a touch control signal line distribution method to solve the problem that electrochemical corrosion easily occurs on the touch control signal lines.

In order to achieve the above object, the embodiments of the present disclosure adopt the following technical solutions: a touch control display substrate which includes a central touch control area and a wiring area located around the central touch control area, wherein the wiring area is provided with isolation lines and a plurality of touch control signal lines led out from the central touch control area, and the extension direction of the isolation lines is parallel to the extension direction of the touch control signal lines;

the touch control signal lines include first touch control signal lines arranged close to the isolation lines and second touch control signal lines arranged away from the isolation lines, and the width of the first touch control signal lines is greater than the width of the second touch control signal lines.

Optionally, the wiring area includes a turning and winding portion, the first touch control signal lines include first sub-touch control signal lines located at the turning and winding portion, and second sub-touch control signal lines located at an area outside the turning and winding portion, and the width of the first sub-touch control signal lines is the same as the width of the second sub-touch control signal lines;

the second touch control signal line includes a third sub-touch control signal line located at the turning and winding portion, and a fourth sub-touch control signal line located in the area outside the turning and winding portion, and the width of the third sub-touch control signal lines is less than the width of the fourth sub-touch control signal line.

Optionally, a polaroid setting area and a first area located at the periphery of the polaroid setting area are included, wherein the first touch control signal line includes a fifth sub-touch control signal line located at the polaroid setting area and a sixth sub-touch control signal line located at the first area, and the width of the fifth sub-touch control signal line is less than the width of the sixth sub-touch control signal line.

Optionally, the touch control signal lines include a plurality of driving signal lines and a plurality of sensing electrode signal lines arranged in parallel, the plurality of driving electrode signal lines and the plurality of sensing electrode signal lines are respectively located on two opposite sides of the isolation line, and the first touch control signal lines include the driving electrode signal lines and the sensing electrode signal lines arranged close to the isolation line.

Optionally, the touch control signal lines include the plurality of driving signal lines and the plurality of sensing electrode signal lines arranged in parallel, the isolation lines include a first sub-isolation line and a second sub-isolation line, the plurality of the driving electrode signal lines and the plurality of the sensing electrode signal lines are located on the same side of the first sub-isolation lines, and the second sub-isolation lines are arranged between the driving electrode signal lines and the sensing electrode signal lines, and the first touch control signal lines include the sensing electrode signal lines or the driving electrode signal lines arranged close to the first sub-isolation lines; and the driving electrode signal lines and the sensing electrode signal lines arranged close to the second sub-isolation lines.

Optionally, the driving electrode signal lines, the second sub-isolation lines, the sensing electrode signal lines and the first sub-isolation lines are distributed in sequence along the direction away from the central touch control area, wherein the sensing electrode signal lines include first signal lines arranged close to the first sub-isolation lines, second signal lines arranged close to the second sub-isolation lines and third signal lines except the first signal lines and the second signal lines, and the driving electrode signal lines include fourth signal lines arranged close to the second sub-isolation lines; and fifth signal lines other than the fourth signal lines; and the first touch signal lines include the first signal lines, the second signal lines, and the fourth signal lines, and the second touch signal lines include the third signal lines and the fifth signal lines.

Optionally, the width of the first signal lines is greater than the width of the second signal lines, the width of the fourth signal lines is greater than the width of the second signal lines, and the width of the second signal lines is greater than the width of the third signal lines, which is equal to the width of the fifth signal lines.

Optionally, the first sub-isolation lines are ground lines.

Optionally, the touch control display substrate is a flexible touch control display substrate, the touch control display substrate is the flexible touch control display substrate, wiring of the touch control area is distributed in different planes and the wiring include the touch control signal lines and the isolation lines.

The embodiments of the present disclosure provide a touch display device which includes the above-described touch display substrate.

The embodiment of the present disclosure provides a touch control signal line distribution method, which is used for setting the touch control signal lines on the abovementioned touch control display substrate, including the following steps:

acquiring factors causing electrochemical corrosion on the touch control signal lines, wherein the factors include a potential difference and water vapor;

establishing a series resistance model with a non-uniform line width to obtain the relationship between the potential difference and a line width; and setting the line width of the touch control signal lines according to the described factors and the relationship between the potential difference and the line width, so that the width of the first touch control signal lines is greater than the width of the second touch control signal lines.

Optionally, the step of acquiring factors causing electrochemical corrosion on the touch control signal lines specifically includes:

performing a test on an electrical signal of the touch control signal lines to obtain test results when there is the potential difference between the first touch control signal lines and the isolation lines, and there is no potential difference between two adjacent touch control signal lines;

according to a redox reaction of a metal in an electrolyte solution, the factors causing the electrochemical corrosion of the touch control signal lines include the electric potential difference and the water vapor, the greater the electric potential difference, the easier the electrochemical corrosion occurs, and/or the greater the water vapor, the easier the electrochemical corrosion occurs.

Optionally, the step of establishing a series resistance model with a non-uniform line width to obtain the relationship between the potential difference and a line width specifically includes:

setting the touch control signal lines as first segments and second segments with different widths, and equivalently as a series structure, wherein the resistance of the first segments is $R_1$, and the resistance of the second segments is $R_2$;

providing a current I to the touch control signal lines to obtain a voltage of the first segments $U_1=IR_1$ and a voltage of the second segment $U_2=IR_2$; and obtaining the relationship between the potential difference and the line width W according to a resistance formula: $U_1/U_2=W_1/W_2$, wherein $W_1$ is the line width of the first segments, $W_2$ is the line width of the second segments, the resistance formula is $R=\rho*L/S$, wherein $\rho$ is the resistivity, L is the length, S is the cross-sectional area=W*d, d is the thickness, and the thickness of the first segments is the same as the thickness of the second segments.

Advantageous effects of the present disclosure are: by setting the line width of the touch control signal lines, the time of the electrochemical corrosion of the touch control signal lines can be optimized and the reliability of products can be improved.

DETAILED DESCRIPTION

Figure 1:
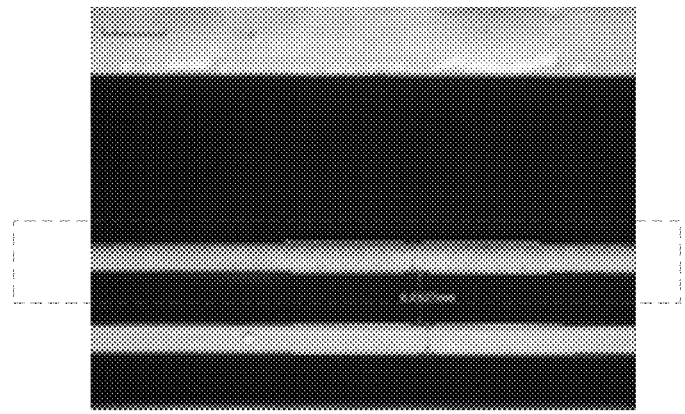
FIG. 1 is a schematic diagram 1 of electrochemical corrosion test results according to an embodiment of the present disclosure.

To further clarify the objectives, features and advantages of the embodiments of the present disclosure, the technical solutions in the embodiments of the present disclosure will be clearly and completely described below in combination with the drawings in the present disclosure. It is to be understood that the described embodiments are part, but not all, of the disclosed embodiments. Based on the embodiments in the present disclosure, all other embodiments obtained by a person of ordinary skill in the art without inventive effort are within the scope of protection of this disclosure.

In the description of the present disclosure, it should be understood that the orientation or positional relationship indicated by the terms "center", "upper", "lower", "front", "rear", "left", "right", "vertical", "horizontal", "top", "bottom", "inner", "outer", and the like is based on the orientation or positional relationship shown in the drawings, and is merely for convenience of describing the disclosure and simplifying the description, but not intended or implied that the referenced device or element must have a particular orientation, be constructed and operated in a particular orientation, and thus should not be construed as limiting the present disclosure. The terms "first", "second", and "third"

are used for descriptive purposes only and are not to be construed as indicating or implying relative importance.

Flexible touch screen is used in the fields of advanced flagship mobile phones, vehicle-mounted curved screens and others. Because the trust requirement becomes more and more strict, currently routing materials are an APC (silver palladium copper) metal, mainly containing Ag, Pd, Cu, etc. Since silver cannot form a stable and passivated oxide film, the electrical chemical migration and corrosion easily occurs on the silver material. The process for determining the factors at which electrochemical corrosion occurs is described in detailed as follows.

A 8585 test is performed on the products. Specifically, in a sealed environment with 85° C. and 85% humidity, a power-on test is performed on the products after the products are placed for 240 h, and the test results for the touch signal lines with different line widths are obtained. The phenomenon of the electrochemical corrosion is that Trace (touch signal line) is black and corrosion is open, and the corrosion position is concentrated on the touch signal lines near the ground lines and/or the isolation lines, and shows a correlation with the line widths, the thinner the line width is, the easier the corrosion is.

Figure 2:
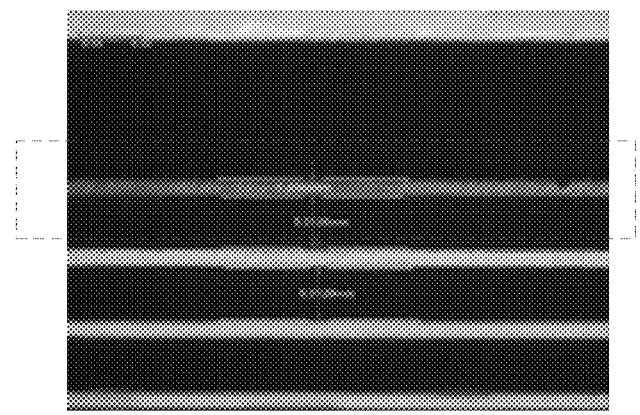
FIG. 2 is a schematic diagram 2 of electrochemical corrosion test results according to an embodiment of the present disclosure.
Figure 3:
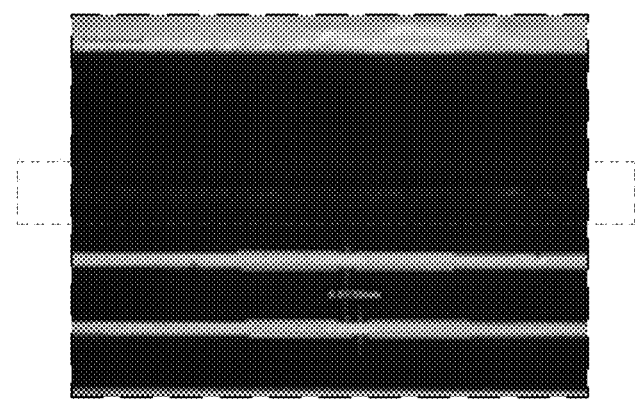
FIG. 3 is a schematic diagram 3 of electrochemical corrosion test results according to an embodiment of the present disclosure.

An electrochemical corrosion state of the touch signal lines with a line width of 7.2 μm is shown in a dotted line box in FIG. 1, the electrochemical corrosion state of the touch signal lines having a line width of 4.7 μm is shown in a dotted line box in FIG. 2, and the electrochemical corrosion state of the touch signal lines having a line width of 4.0 μm is shown in a dotted line box in FIG. 3. By comparing FIG. 1, FIG. 2, and FIG. 3, it can be seen that the thinner the line width, the more susceptible to corrosion.

The touch signal lines Trace include a driving electrode signal lines Tx and/or a sensing electrode signal lines Rx, and the function of ground lines or the isolation lines is to prevent signal interference. For IC output signal, it is found through an oscilloscope test that Tx and Rx have output voltage signals with respect to Guard or GND line; in the obtained test results, maximum Rx is 2.4 V and Tx is 3.2 V, and a signal band period is 120 Hz. So that there is a voltage U between the Guard and/or GND and the adjacent Trace; there is no voltage difference between Trace and Trace.

Figure 4:
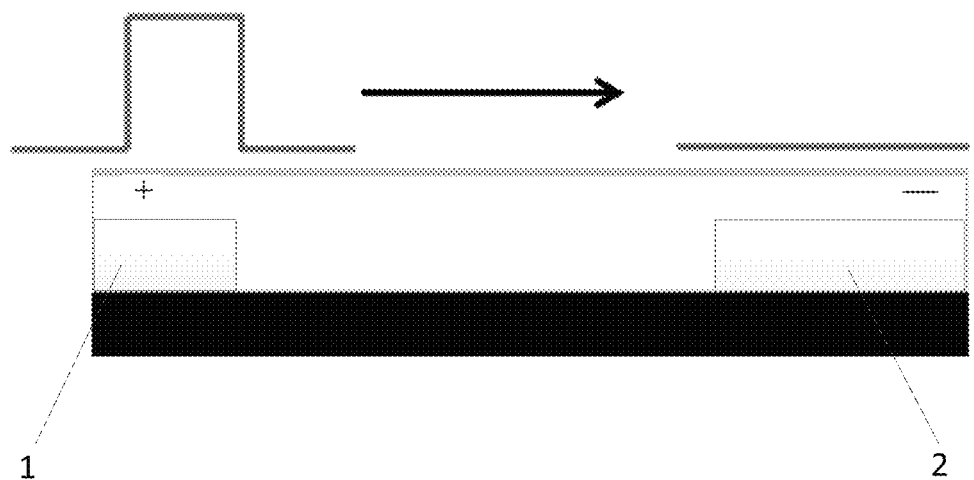
FIG. 4 is a schematic diagram of a redox reaction principle of a metal in an electrolyte solution.

The electrochemical corrosion: the redox reaction of the metal in the electrolyte solution has the following main chemical mechanism:

Referring to FIG. 4, the potential difference exists between the touch control signal lines 1 and the isolation lines or the ground line (hereinafter all are described as the isolation lines), constituting the anode and the cathode of the electrochemical corrosion; the touch control signal lines 1 are a positive electrode, and an oxidation reaction occurs; and the isolation lines 2 are the cathode, and the reduction reaction occurs (taking Ag as an example for explanation).

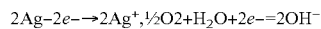

$2Ag-2e^- \rightarrow 2Ag^+, \frac{1}{2}O_2+H_2O+2e^-=2OH^-$

Ag+ and OH-form AgOH and precipitate on the anode, $Ag^+ + OH^- \rightarrow AgOH$;

AgOH decomposes unstably and forms black $Ag_2O$ at the anode, $AgOH \rightleftharpoons Ag_2O + H_2O$;

It can be seen from the above theory that electrochemical corrosion occurs, and the potential difference and the water vapor are necessary conditions and the relationship is proportional; the greater the voltage is, the easier the corrosion is, and the greater the water vapor is, the easier the corrosion is.

Figure 5:
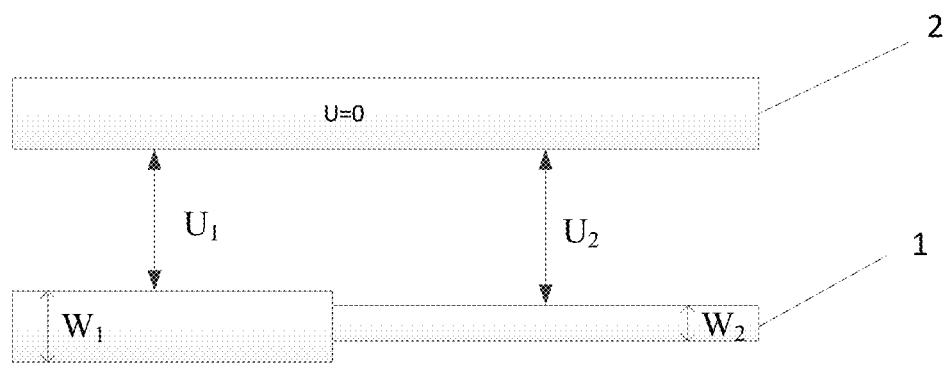
FIG. 5 is a schematic structural diagram of touch control signal lines with different widths according to an embodiment of the present disclosure.
Figure 6:
FIG. 6 is a schematic diagram of an equivalent series structure of touch control signal lines with the same width.

On the basis of the above-mentioned conclusion, dividing the touch control signal lines 1 along the extension direction thereof into the first segments with the line width $W_1$ and the second segments with the line width $W_2$, and establishing a line width non-uniform series resistance model so as to determine the relationship between the potential difference and the line width. FIG. 5 is a schematic structural diagram of touch control signal lines with different widths and FIG. 6 is a schematic diagram of an equivalent series structure of touch control signal lines with the same width.

The resistance calculation formula: $R=\rho*L/S$, wherein $\rho$ is the resistivity, L is the length, and S is the cross-sectional area=$W*d$ (d is the thickness, and the whole thickness of the touch control signal lines is constant);

the resistance of the first segments $R_1=\rho*L/(W_1*d)$;

the resistance $R_2$ of the second segment=$\rho*L/(W_2*d)$;

$R_1/R_2=W_2/W_1$ can be obtained from the above formula; and the first segments and the second segments can be equivalent to a series structure, and setting a power supply test current signal of the touch control signal lines to be I, and if the signal of the series current are consistent, then the voltage of the first segments is $U_1=I*R_1$, and the voltage of the second segments is $U_2=I*R_2$, then $U_1/U_2=W_2/W_1$, and thus the potential difference ratio can be obtained to be inversely proportional to the line width.

The potential difference is inversely proportional to the line width of the corresponding area, and the wider the line width is, the lower the potential difference of the corresponding area is. According to the principle of the electrochemical corrosion, the presence of the potential difference accelerates the movement of ions, thereby accelerating the electrochemical corrosion rate.

And the current of the series circuit is the same, and the wider the line width is, the smaller the current density is, and the ion movement speed is slowed down, thereby slowing down the electrochemical corrosion rate.

In order to confirm the above-mentioned theoretical structure, the present embodiment performs theoretical verification by giving a high-level signal to some touch control signal lines, for example, giving the high-level signal to Rx2&Rx5 (i. e. Rx numbered 2 and Rx numbered 5), and giving 0 to the rest of the touch control signal lines, putting into 8585 trustworthiness test, and observing the results. The poor electrochemical corrosion of the touch signal line can be effectively reproduced, and at the same time, the correlation between the degree of electrochemical corrosion and the line width is consistent with the above-mentioned theory, i. e. the thinner part of the line width of the touch signal is more susceptible to corrosion.

After obtaining the factors of electrochemical corrosion, the present embodiment provides a touch display substrate in order to prolong the time of electrochemical corrosion and improve product reliability. With reference to FIGS. 7-13, the touch display substrate includes a central touch area 100 and a wiring area 200 located around the central touch area 100, the wiring area 200 is provided with an isolation line 2 and a plurality of touch signal lines led out from the central touch area 100, the extension direction of the isolation line 2 is parallel to the extension direction of the touch signal lines.

the touch control signal lines include a first touch control signal line 11 arranged close to the isolation line 2, and a second touch control signal line 12 arranged far away from the isolation line 2, and the width of the first touch control signal line 11 is greater than the width of the second touch control signal line 12.

Figure 7:
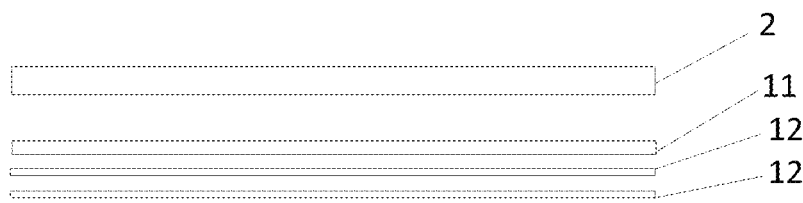
FIG. 7 is a schematic structural diagram of touch control wiring according to an embodiment of the present disclosure.

It can be seen from the above-mentioned, since the potential difference exists between the isolation lines 2 and the touch control signal lines adjacent thereto, the electrochemical corrosion is concentrated on the first touch control signal lines 11 adjacent to the isolation lines 2, and according to the above-mentioned obtained conclusion: the potential difference ratio is inversely proportional to the line width; however, according to the principle of the electrochemical corrosion, the presence of the potential difference accelerates the movement of ions, thereby accelerating the electrochemical corrosion rate; in the present embodiment, in order to avoid alleviating the electrochemical corrosion, the line width of the first touch control signal lines 11 is increased, and the width of the second touch control signal lines 12 is unchanged (namely, making the width of the first touch control signal lines 11 greater than the width of the second touch control signal lines 12), the potential difference between the first touch control signal lines 11 and the isolation lines 2 is reduced, thereby slowing down the electrochemical corrosion rate and improving product reliability, and can be achieved without additional manufacturing process steps, referring to FIG. 7.

It should be noted that the extension direction of the isolation lines 2 is parallel to the extension direction of the touch control signal lines, and the parallel referred to herein may or may not be absolute parallel, because a certain error is allowed to exist in actual operation.

It should be noted that the width of the isolation line is generally 200 μm, the spacing between the touch control signal lines and the isolation line is 20 μm, in a narrow frame product, the width of the touch control signal lines is generally less than 10 μm, in at least one embodiment of the present embodiment, the width of the touch control signal lines is 4-8 μm, for example, the width of the first touch control signal line is 8 μm, and the width of the second touch control signal line is less than 8 μm, and in one embodiment, the width of the second touch control signal line is 4 μm, but this is not a limitation.

Figure 8:
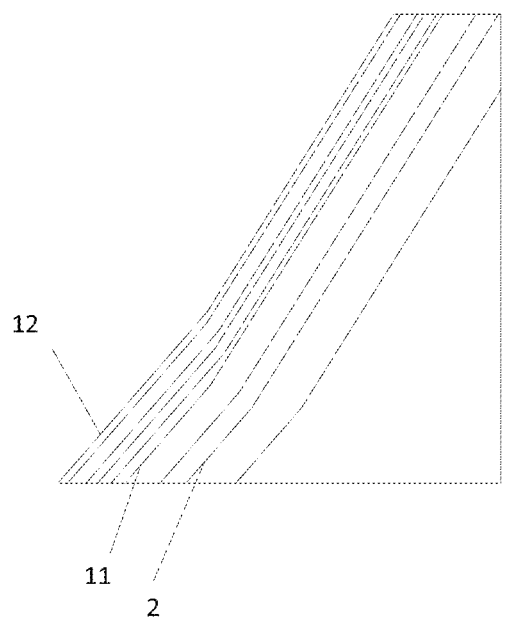
FIG. 8 is a schematic diagram of line width narrowing of touch signal lines in a turning and winding area in the related art.

There will be a turning area exists around the touch control signal lines winding screen of the touch screen, and the inventors have found that in the relevant solutions, due to limited space, an overall line width narrowing operation is used in the turning line-receiving area, with reference to FIG. 8. In conjunction with the above-mentioned relationship between the line width and the occurrence of the electrochemical corrosion, it can be seen that when the line width of the touch control signal lines adjacent to the isolation lines 2 in the turning and winding area becomes smaller, the potential difference between the isolation lines 2 and the touch control signal lines adjacent thereto in the winding area will increase, thereby accelerating the electrochemical corrosion rate and reducing the electrochemical corrosion resistance of the touch control signal lines 1, and the turning and winding area becomes a weak point.

Figure 9:
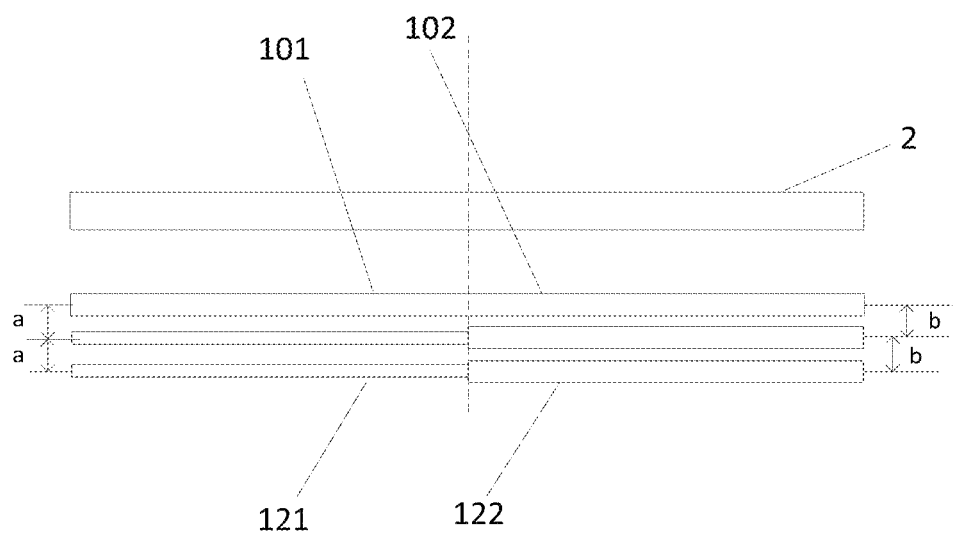
FIG. 9 is a schematic structural diagram 2 of a touch control wiring according to an embodiment of the present disclosure.

With regard to the above-mentioned problem, in the present embodiment, by way of example, referring to FIG. 9, the wiring area 200 includes a turning and receiving portion (a portion located on the left side of a dotted line in FIG. 9), the first touch control signal line 11 includes a first sub-touch control signal line 101 located on the turning and receiving portion, and a second sub-touch control signal line 102 located in a area outside the turning and receiving portion, the width of the first sub-touch control signal line 101 is the same as the width of the second sub-touch control signal line 102;

And the second touch control signal line 12 includes a third sub-touch control signal line 121 located at the turn receiving portion, and a fourth sub-touch control signal line 122 located at a area outside the turn receiving portion, wherein the width of the third sub-touch control signal line 121 is less than the width of the fourth sub-touch control signal line 122.

In the present embodiment, in the first touch control signal line 11 adjacent to the isolation line 2, the first sub-touch control signal line 101 located in the turning and line-receiving area and the second sub-touch control signal line 102 located in the area outside the turning and line-receiving area are provided with the same width, that is to say, the width of the first touch control signal line 11 in the turning and line-receiving area remains unchanged, while only the second touch control signal line 12 is narrowed in the turning and line-receiving area, which solves the problem of space limitation. And solve the problem that the first touch control signal line 11 adjacent to the isolation line 2 in the turning line receiving area is prone to electrochemical corrosion due to line width narrowing.

It should be noted that, in the present embodiment, the spacing between the center lines of the two adjacent touch control signal lines is the same whether in the turning and winding portion or in a area other than the turning and winding portion. Referring to FIG. 9, in the turning and winding portion, the line width of the second touch-control signal lines is narrowed. However, the spacing between the center lines of the first touch-control signal lines 11 and the center lines of the second touch-control signal lines 12 is a, and the spacing between the center lines of two adjacent touch-control signal lines 12 is also a. In other areas of the turning and winding portion, the spacing between the center lines of the two adjacent touch control signal lines is also the same, the spacing between the center lines of the first touch control signal lines 11 and the center lines of the second touch control signal lines 12 is b, and the spacing between the center lines of the two adjacent touch control signal lines 12 is also b.

Figure 10:
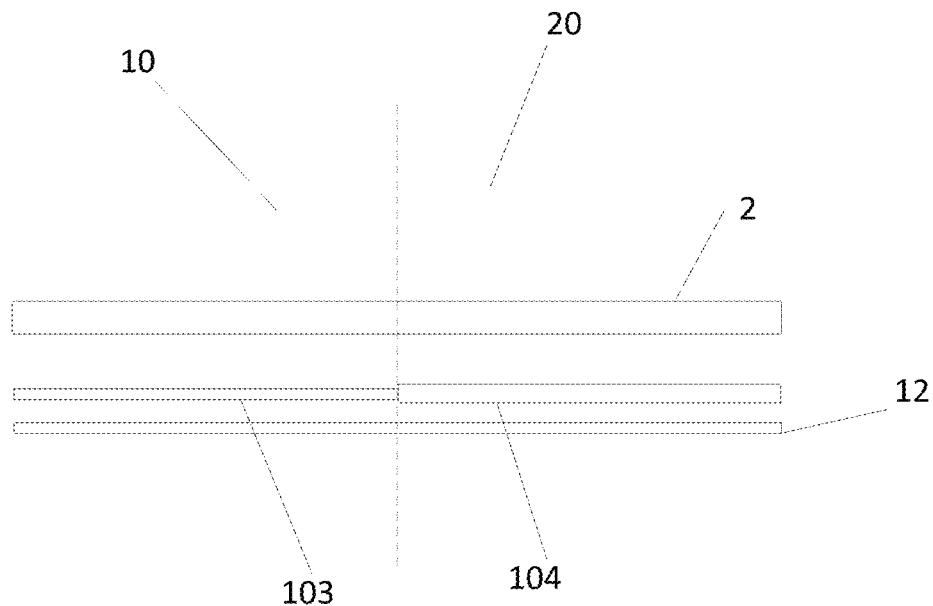
FIG. 10 is a schematic structural diagram 3 of a touch control wiring according to an embodiment of the present disclosure.

In the present embodiment, the touch control display substrate includes the polaroid setting area 10 and the first area 20 located at the periphery of the polaroid setting area 10, the first touch control signal lines 11 include fifth sub-touch control signal lines 103 located at the polaroid setting area 10 and sixth sub-touch control signal lines 104 located at the first area 20, the width of the fifth sub-touch control signal lines 103 is less than the width of the sixth sub-touch control signal lines 104, referring to FIG. 10.

The polaroid setting area 10 covers the central touch control area and covers part of the wiring area; in the polaroid setting area 10, since the arrangement of a polaroid has a protection function (the polaroid is adhered to the touch control display substrate via an optical glue, and can have the function of preventing water vapor from invading), while the first area 20 is not provided with the polaroid, the water vapor protection is poor, and the H factor of the first area 20 is greater than the H factor in the polaroid setting area 10; therefore, the touch signal lines located in the first area 20 is susceptible to the electrochemical corrosion with respect to the touch signal lines located in the polaroid setting area 10. In the present embodiment, the width of the first touch signal lines 11 located in the first area 20 is increased, i. e. the width of the fifth sub-touch control signal lines 103 is smaller than the width of the sixth sub-touch control signal lines 104, while the width of the second touch signal lines 12 is kept constant, thereby improving product reliability.

Exemplarily in the present embodiment, the touch signal lines 1 include the driving electrode signal lines or the sensing electrode signal lines.

Exemplarily in the present embodiment, the touch control signal lines 1 include a plurality of driving signal lines and a plurality of sensing electrode signal lines arranged in parallel, the plurality of driving electrode signal lines and the plurality of sensing electrode signal lines are respectively located on two opposite sides of the isolation lines 2, and the first touch control signal lines 11 include the driving electrode signal lines and the sensing electrode signal lines arranged close to the isolation lines 2.

Figure 11:
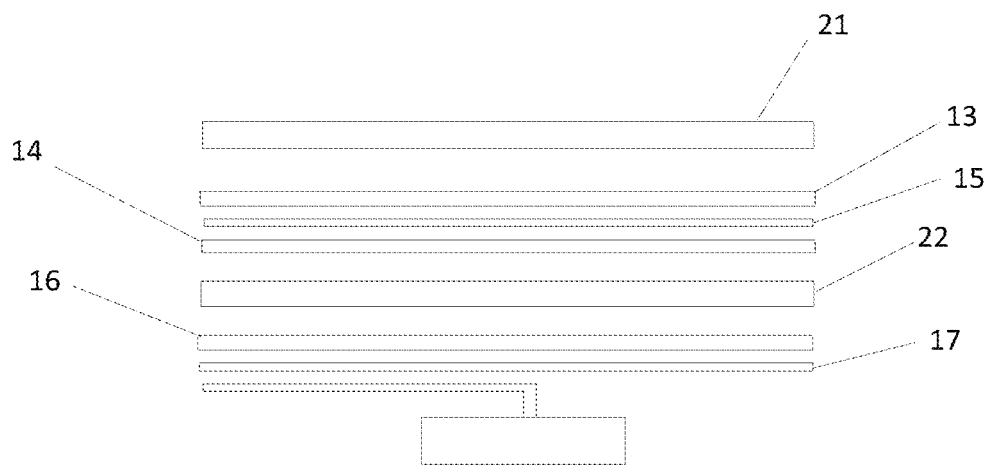
FIG. 11 is a schematic structural diagram 4 of a touch control wiring according to an embodiment of the present disclosure.

Referring to FIG. 11, exemplarily in the present embodiment, the touch control signal lines 1 include the plurality of driving signal lines and the plurality of sensing electrode signal lines arranged in parallel, the isolation lines 2 include first sub-isolation lines 21 and second sub-isolation lines 22, the plurality of the driving electrode signal lines and the plurality of the sensing electrode signal lines are located on the same side of the first sub-isolation lines 21, and the second sub-isolation lines 22 are arranged between the driving electrode signal lines and the sensing electrode signal lines, and the first touch control signal lines 11 include the sensing electrode signal lines or the driving electrode signal lines arranged close to the first sub-isolation lines 21, and the driving electrode signal lines and the sensing electrode signal lines arranged close to the second sub-isolation lines 22.

Figure 13:
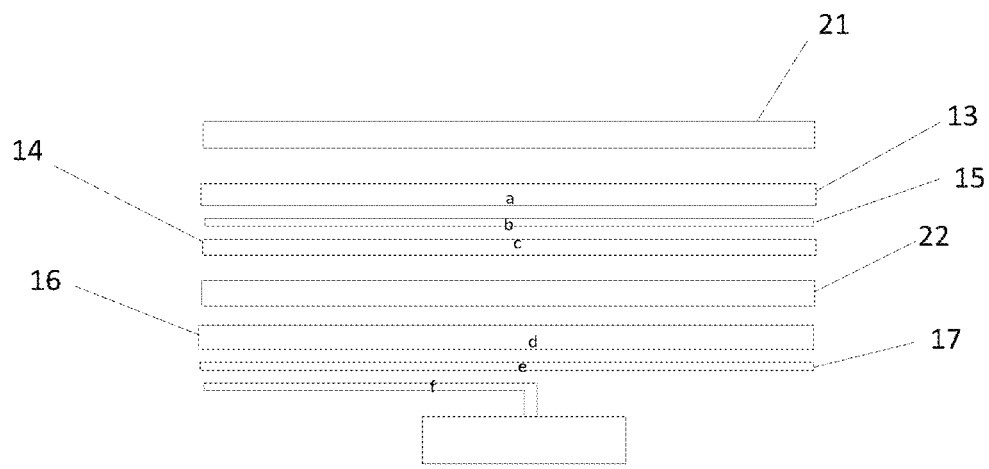
FIG. 13 is a schematic structural diagram 5 of a touch control wiring according to an embodiment of the present disclosure.

Exemplarily in the present embodiment, in the direction away from the central display 100, the wiring area 200 is successively distributed with the driving electrode signal lines, the second sub-isolation lines 22, the sensing electrode signal lines, the first sub-isolation line 21, and the sensing electrode signal lines include the first signal lines 13 arranged close to the first sub-isolation lines 21, the second signal lines 14 arranged close to the second sub-isolation lines 22, and the third signal lines 15 other than the first signal lines 13, and the second signal lines 14. The driving electrode signal lines include the fourth signal lines 16 arranged close to the second sub-isolation lines 22, and the fifth signal lines 17 other than the fourth signal lines 16;

the first touch signal lines 11 include the first signal lines 13, the second signal lines 14, and the fourth signal lines 16, and the second touch signal lines 12 include the third signal lines 15 and the fifth signal lines 17, referring to FIGS. 11 and 13.

Figure 12:
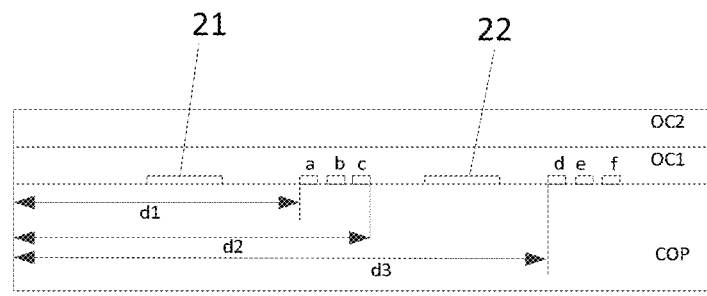
FIG. 12 is a schematic structural diagram 1 of a touch control display substrate according to an embodiment of the present disclosure.

Referring to FIG. 12, in a practical product, the distance between the first signal lines 13 (signal lines a) and the edge of the touch control display substrate is d1, the distance between the second signal lines (signal line c) 14 and the edge of the touch control display substrate is d2, and the distance between the fourth signal lines 16 (signal line d) and the edge of the touch control display substrate is d3, and d1<d2<d3; during the reliability test, the water vapor factor at the first signal lines 13 is H1, the water vapor factor at the second signal lines 14 is H2, and the water vapor factor at the fourth signal lines 16 is H3; and H1>H2>H3, the voltage difference between the first signal lines 13 and the corresponding isolation lines is U1, the voltage difference between the second signal lines 14 and the corresponding isolation lines is U2, the voltage difference between the fourth signal lines 16 and the corresponding isolation lines is U3, the first signal lines 13 and the second signal lines 14 are both sensing electrode signal lines, and the fourth signal lines 16 is the driving electrode signal lines; therefore, U1=U2, U3>U1, and according to the electrochemical corrosion principle, the failure time of the electrochemical corrosion at three places of a, c, and d is inconsistent.

In order to optimize the line width distribution and improve the reliability ability. In combination with the water vapor factor H and the potential difference factor U, balancing several failure times T to realize a limited space and optimizing a line width design, and in the present embodiment, as an example, the relationship between the widths of the touch control signal lines is: Wa>Wc, Wd>Wc, Wc>Wb=We=Wf, that is, the width of the first signal lines 13 is greater than the width of the second signal lines 14, the width of the fourth signal lines 16 is greater than the width of the second signal lines 14, and the width of the second signal lines 14 is greater than the width of the third signal lines 15, and the width of the third signal lines 15 is equal to the width of the fifth signal lines 17, referring to FIG. 13.

The distribution manner of the touch control signal lines 1 and the isolation lines 2 is not limited to the above, and for example, the following distribution manner is also possible: the sensing electrode signal lines, the second sub-isolation lines 22, the driving electrode signal lines, and the first sub-isolation lines 21 are distributed in sequence along the direction away from the central touch control area in the wiring area 200, so that the first signal lines are the sensing electrode signal lines arranged close to the first sub-isolation lines 21, the second signal lines are sensing electrode signal lines arranged close to the second sub-isolation lines 22, and the fourth signal lines are the driving electrode signal lines arranged close to the second sub-isolation lines 22.

Exemplarily in the present embodiment, the first sub-isolation lines 21 are the ground lines.

Exemplarily in the present embodiment, the touch control display substrate is a flexible touch control display substrate, wiring distribution of the wiring area are distributed on different planes, and the wiring includes the touch control signal lines and the isolation lines.

Figure 15:
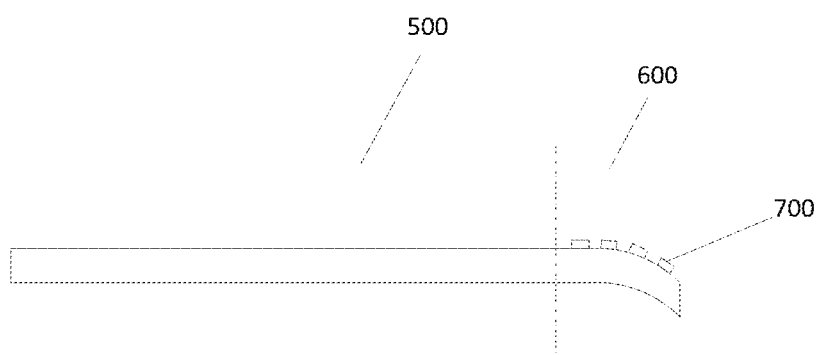
FIG. 15 is a schematic structural diagram 3 of a touch control display substrate according to an embodiment of the present disclosure.

In the present embodiment, the touch display substrate is the flexible touch display substrate, for example, the flexible touch display substrate includes a planar area and a bendable area 600 located on at least one side of the planar area 500; referring to FIG. 15, the central touch area is located on the planar area 500, and in some embodiments, the central touch area covers part of the bendable area 600, the wiring area is located on the bendable area 600, and the routing 700 is located on different planes.

The embodiments of the present disclosure provide the touch display device which includes the above-described touch display substrate.

Figure 14:
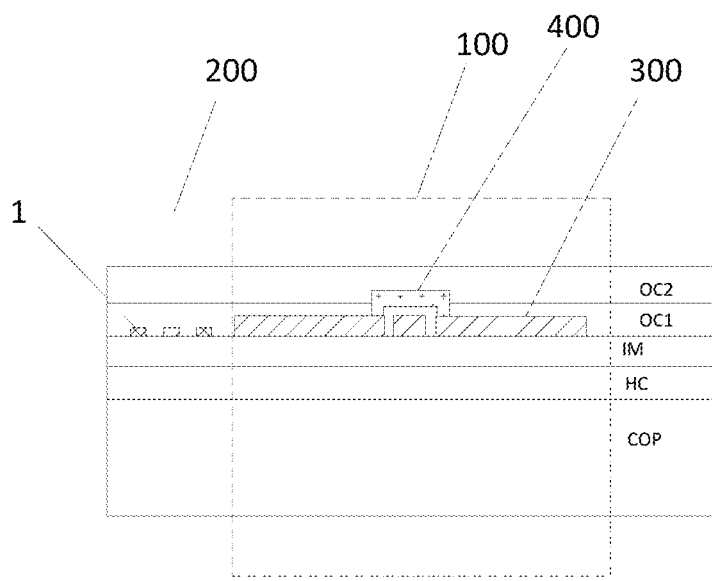
FIG. 14 is a schematic structural diagram 2 of a touch control display substrate according to an embodiment of the present disclosure.

Referring to FIG. 14, exemplarily in the present embodiment, the touch control display substrate includes a COP base material, an HC hardening layer, an IM shadow-eliminating layer, an ITO1 pattern layer 300, and an ITO2 pattern layer 400, and the touch control display substrate includes the central touch control area 100 and the wiring area 200 located at the periphery of the central touch control area 100. FIG. 14 shows that, located in the central touch control area 100, the ITO1 pattern layer forms the driving electrode signal lines and the sensing electrode signal lines which are arranged in an intersecting manner and the touch control signal lines 1 led out by the moving electrode signal lines and the sensing electrode signal lines in the central touch control area 100 and located in the wiring area 200, wherein in the central touch control area 100, at the position where the driving electrode signal lines and sensing electrode signal lines overlap, electrode signal lines of the same type are bridged via the ITO2 pattern layer.

The embodiment of the present disclosure provides the touch control signal line 1 distribution method, which is used for setting the touch control signal lines 1 on the above-mentioned touch control display substrate, including the following steps:

acquiring factors causing electrochemical corrosion on the touch control signal lines 1, wherein the factors include the potential difference and the water vapor;

establishing the series resistance model with the non-uniform line width to obtain the relationship between the potential difference and the line width; and setting the line width of the touch control signal lines 1 according to the described factors and the relationship between the potential difference and the line width, so that the width of the first touch control signal lines 11 is greater than the width of the second touch control signal lines 12.

Exemplarily in the present embodiment, the step of acquiring factors causing electrochemical corrosion on the touch control signal lines 1 specifically includes:

performing a test on the electrical signal of the touch control signal lines 1 to obtain the test results when the potential difference exists between the first touch control signal lines 11 and the isolation lines 2, or when no potential difference exists between two adjacent touch control signal lines 1;

according to the redox reaction of the metal in the electrolyte solution, the factors causing the electrochemical corrosion of the touch control signal lines 1 include the electric potential difference and the water vapor, the greater the electric potential difference, the easier the electrochemical corrosion occurs, and/or the greater the water vapor, the easier the electrochemical corrosion occurs.

Exemplarily in the present embodiment, the step of establishing the series resistance model with the non-uniform line width to obtain the relationship between the potential difference and the line width specifically includes:

setting the touch control signal lines 1 as the first segments and the second segments with different widths, and equivalently as the series structure, wherein the resistance of the first segments is $R_1$, and the resistance of the second segments is $R_2$;

providing a current I to the touch control signal lines 1 to obtain a voltage of the first segments $U_1=IR_1$ and a voltage of the second segment $U_2=IR_2$; and obtaining the relationship between the potential difference and the line width W according to a resistance formula: $U_1/U_2=W_1/W^2$, wherein $W_1$ is the line width of the first segments, $W_2$ is the line width of the second segments, the resistance formula is $R=\rho*L/S$, wherein $\rho$ is the resistivity, L is the length, S is the cross-sectional area=W*d, d is the thickness, and the thickness of the first segments is the same as the thickness of the second segments.

The foregoing is only part of optimal embodiments of the present disclosure, it should be noted that, by those skilled in the art that various improvements and modifications may be made without departing from the principle of the present disclosure, and theses improvement and modifications shall fall within the scope of protection of the present disclosure.

What is claimed is:

1. A touch control display substrate, comprising a central touch control area and a wiring area located around the central touch control area, wherein the wiring area is provided with isolation lines and a plurality of touch control signal lines led out from the central touch control area, and an extension direction of the isolation lines is parallel to an extension direction of the touch control signal lines, wherein the touch control signal lines comprise first touch control signal lines arranged close to the isolation lines and second touch control signal lines arranged away from the isolation lines, and a width of the first touch control signal lines is greater than a width of the second touch control signal lines;

wherein the touch control signal lines comprise a plurality of driving signal lines and a plurality of sensing electrode signal lines arranged in parallel, the plurality of driving electrode signal lines and the plurality of sensing electrode signal lines are respectively located on two opposite sides of the isolation line, and the first touch control signal lines comprise the driving electrode signal lines and the sensing electrode signal lines arranged close to the isolation lines.

2. The touch control display substrate according to claim 1, wherein the wiring area comprises a turning and winding portion, the first touch control signal lines comprise first sub-touch control signal lines located at the turning and winding portion, and second sub-touch control signal lines located at an area outside the turning and winding portion, and a width of the first sub-touch control signal lines is the same as a width of the second sub-touch control signal lines;

the second touch control signal lines comprise third sub-touch control signal lines located at the turning and winding portion, and fourth sub-touch control signal lines located in the area outside the turning and winding portion, and a width of the third sub-touch control signal lines is less than a width of the fourth sub-touch control signal lines.

3. The touch display substrate according to claim 1, comprising a polaroid setting area and a first area located at the periphery of the polaroid setting area are included, wherein the first touch control signal lines comprise fifth sub-touch control signal lines located at the polaroid setting area and sixth sub-touch control signal lines located at the first area, and a width of the fifth sub-touch control signal lines is less than a width of the sixth sub-touch control signal lines.

4. The touch control display substrate according to claim 1, wherein the isolation lines comprise first sub-isolation lines and second sub-isolation lines, the plurality of the driving electrode signal lines and the plurality of the sensing electrode signal lines are located on the same side of the first sub-isolation lines, and the second sub-isolation lines are arranged between the driving electrode signal lines and the sensing electrode signal lines, and the first touch control signal lines comprise the sensing electrode signal lines or the driving electrode signal lines arranged close to the first sub-isolation lines; and the driving electrode signal lines and the sensing electrode signal lines arranged close to the second sub-isolation lines.

5. The touch control display substrate according to claim 4, wherein the driving electrode signal lines, the second sub-isolation lines, the sensing electrode signal lines and the first sub-isolation lines are distributed in sequence along a direction away from the central touch control area, wherein the sensing electrode signal lines comprise first signal lines arranged close to the first sub-isolation lines, second signal lines arranged close to the second sub-isolation lines and third signal lines except the first signal lines and the second signal lines, and the driving electrode signal lines comprise fourth signal lines arranged close to the second sub-isolation lines; and fifth signal lines other than the fourth signal lines; and the first touch signal lines comprise the first signal lines, the second signal lines, and the fourth signal lines, and the second touch signal lines comprise the third signal lines and the fifth signal lines.

6. The touch control display substrate according to claim 5, wherein a width of the first signal lines is greater than a width of the second signal lines, a width of the fourth signal lines is greater than a width of the second signal lines, and a width of the second signal lines is greater than a width of the third signal lines, which is equal to the width of the fifth signal lines.

7. The touch control display substrate according to claim 1, wherein the first sub-isolation lines are ground lines.

8. The touch control display substrate according to claim 1, wherein the touch control display substrate is a flexible touch control display substrate, the touch control display substrate is the flexible touch control display substrate, wiring of the touch control area is distributed in different planes and the wiring includes the touch control signal lines and the isolation lines.

9. A touch control display device comprising the touch control display substrate according to claim 1.

10. A touch control signal line distribution method, wherein the touch control signal lines on the touch control display substrate according to claim 1 comprises the following steps:
  acquiring factors causing electrochemical corrosion on the touch control signal lines, wherein the factors include a potential difference and water vapor;
  establishing the series resistance model with the non-uniform line width to obtain the relationship between the potential difference and the line width; and
  setting the line width of the touch control signal lines according to the described factors and the relationship between the potential difference and the line width, so that the width of the first touch control signal lines is greater than the width of the second touch control signal lines.

11. The touch control signal line distribution method according to claim 10, wherein the acquiring factors causing electrochemical corrosion on the touch control signal lines further comprises:
  performing a test on an electrical signal of the touch control signal lines to obtain test results when there is the potential difference between the first touch control signal lines and the isolation lines, and there is no potential difference between two adjacent touch control signal lines;
  according to a redox reaction of a metal in an electrolyte solution, the factors causing the electrochemical corrosion of the touch control signal lines comprise the electric potential difference and the water vapor, the greater the electric potential difference, the easier the electrochemical corrosion occurs, and/or the greater the water vapor, the easier the electrochemical corrosion occurs.

12. The touch control signal line distribution method according to claim 10, wherein establishing a series resistance model with a non-uniform line width to obtain the relationship between the potential difference and a line width further comprises:
  setting the touch control signal lines as first segments and second segments with different widths, and equivalently as a series structure, wherein the resistance of the first segments is $R_1$, and the resistance of the second segments is $R_2$;
  providing a current I to the touch control signal lines to obtain a voltage of the first segments $U_1=IR_1$ and a voltage of the second segment $U_2=IR_2$; and
  obtaining the relationship between the potential difference and the line width W according to a resistance formula: $U_1/U_2=W_1/W_2$, wherein $W_1$ is the line width of the first segments, $W_2$ is the line width of the second segments, the resistance formula is $R=\rho*L/S$, wherein $\rho$ is the resistivity, L is the length, S is the cross-sectional area=$W*d$, d is the thickness, and the thickness of the first segments is the same as the thickness of the second segments.

* * * * *